United States Patent
Oota et al.

(10) Patent No.: US 10,920,027 B2
(45) Date of Patent: Feb. 16, 2021

(54) EPOXY RESIN COMPOSITION, MOLDING MATERIAL, AND FIBER-REINFORCED COMPOSITE MATERIAL

(71) Applicant: Mitsubishi Chemical Corporation, Chiyoda-ku (JP)

(72) Inventors: Akira Oota, Tokyo (JP); Masahiro Ichino, Tokyo (JP); Takuya Teranishi, Tokyo (JP); Mitsuru Kutsuwada, Tokyo (JP); Yusuke Watanabe, Yokkaichi (JP); Natsumi Mukouzaka, Yokkaichi (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 236 days.

(21) Appl. No.: 16/113,841

(22) Filed: Aug. 27, 2018

(65) Prior Publication Data

US 2020/0140633 A1 May 7, 2020

Related U.S. Application Data

(63) Continuation of application No. PCT/JP2017/007755, filed on Feb. 28, 2017.

(30) Foreign Application Priority Data

Feb. 29, 2016 (JP) .............................. JP2016-038205

(51) Int. Cl.
| | |
|---|---|
| *C08J 5/10* | (2006.01) |
| *C08J 5/04* | (2006.01) |
| *C08L 63/00* | (2006.01) |
| *C08G 59/40* | (2006.01) |
| *C08K 3/04* | (2006.01) |
| *C08K 5/17* | (2006.01) |
| *C08K 7/02* | (2006.01) |

(52) U.S. Cl.
CPC .............. *C08J 5/10* (2013.01); *C08J 5/042* (2013.01); *C08L 63/00* (2013.01); *C08G 59/4014* (2013.01); *C08J 2363/00* (2013.01); *C08K 3/04* (2013.01); *C08K 5/17* (2013.01); *C08K 7/02* (2013.01)

(58) Field of Classification Search
CPC . C08J 2363/00; C08J 5/042; C08J 5/10; C08J 5/24; C08J 5/04; C09J 163/00; C09J 4/00; C08G 59/50; C08G 59/56; C08G 59/22; C08G 59/3227; C08G 59/38; C08G 59/4014; C08G 59/5026; C08K 7/02; C08K 3/04; C08K 5/17; C09D 163/00; C09D 4/00; C08L 63/00
USPC ................ 428/299.1; 523/400; 525/187, 449
See application file for complete search history.

(56) References Cited

U.S. PATENT DOCUMENTS

| | | | |
|---|---|---|---|
| 5,084,532 | A | 1/1992 | Schenkel |
| 5,350,779 | A | 9/1994 | Hermansen et al. |
| 2012/0328811 | A1 | 12/2012 | Patel et al. |
| 2014/0213729 | A1 | 7/2014 | Hongo |
| 2015/0376327 | A1 | 12/2015 | Ortelt et al. |

FOREIGN PATENT DOCUMENTS

| | | |
|---|---|---|
| CN | 101735570 A | 6/2010 |
| CN | 102020831 A | 4/2011 |
| CN | 102040805 A | 5/2011 |
| CN | 104610529 A | 5/2015 |
| JP | A-58-191723 | 11/1983 |
| JP | A-02-088684 | 3/1990 |
| JP | A-02-088685 | 3/1990 |
| JP | A-02-286722 | 11/1990 |
| JP | A-04-088011 | 3/1992 |
| JP | A-06-166742 | 6/1994 |
| JP | A-2014-517126 | 7/2014 |
| WO | WO 2014/115778 A1 | 7/2014 |

OTHER PUBLICATIONS

Guangzhou Yuebao Chemical Technology, Epoxy REsin E-54, accessed online Jun. 15, 2020.*
Heloxy Modifier 67, 1,4-butanediol diglycidyl ether, accessed online Jun. 15, 2020.*
Chinese Office Action dated Jan. 15, 2020 in corresponding Chinese Patent Application No. 201780009334.7 (with English Translation), 12 pages.
Office Action dated Oct. 11, 2019, in corresponding European Patent Application No. 17759987.5 filed Feb. 28, 2017.
International Search Report dated Jun. 6, 2017 in PCT/JP2017/007755.

(Continued)

*Primary Examiner* — Camie S Thompson
(74) *Attorney, Agent, or Firm* — Oblon, McClelland, Maier & Neustadt, L.L.P.

(57) ABSTRACT

The invention provides an epoxy resin composition that is easily B-staged despite containing an epoxy resin inherently difficult to B-stage, has a long pot life, has excellent processability and storage stability after B-staging, and make it possible to obtain a fiber-reinforced composite material having excellent flexural strength and flexural modulus. A molding material, including a thickened product of an epoxy resin composition; and a reinforcing fiber; wherein the epoxy resin composition including:
a component (A): an aromatic epoxy resin;
a component (B): an alicyclic diamine;
a component (C): an epoxy resin curing agent that is not an alicyclic diamine; and
a component (D): an aliphatic epoxy resin,
wherein, when the viscosity at 25° C. immediately after preparation of the epoxy resin composition is taken as (a) and the viscosity at 25° C. after three hours from the preparation is taken as (b), the epoxy resin composition satisfies:
(a)=0.1 to 25 Pa·s;
(b)=0.1 to 25 Pa·s; and
(b)/(a)≤5.

24 Claims, No Drawings

(56) References Cited

OTHER PUBLICATIONS

Office Action dated Nov. 14, 2017, in Japanese Patent Application No. 2017-514935 (with Machine Translation).
Masaki Shimbo, Epoxy Resin Handbook, Nikkan Kogyo Shimbun, Dec. 25, 1987 (Showa 62), p. 155.
Extended European Search Report dated Feb. 11, 2019 in the corresponding European Application No. 17759987.5.
Office Action and Search Report dated Feb. 20, 2019 in the corresponding Chinese Patent Application No. 201780009334.7 with unedited computer generated English Translation citing documents AA, AO and AP therein 16 pages.

* cited by examiner

US 10,920,027 B2

EPOXY RESIN COMPOSITION, MOLDING MATERIAL, AND FIBER-REINFORCED COMPOSITE MATERIAL

The present application is a continuation application of International application No. PCT/JP2017/007755, filed on Feb. 28, 2017, which claims the priority of Japanese Patent Application No. 2016-038205, filed on Feb. 29, 2016, which is hereby incorporated by reference herein in its entirety.

TECHNICAL FIELD

The present invention relates to an epoxy resin composition, a molding material, and a fiber-reinforced composite material.

BACKGROUND ART

Among intermediate materials (hereinafter also referred to as molding materials) used for the production of fiber-reinforced composite materials (FRP), a sheet molding compound (hereinafter also referred to as SMC) was put to practical use in the early 1970s, and demand of SMC for manufacturing industrial parts, automobile parts, bathtubs, and the like has increased. SMC is composed of a reinforced short fiber and a matrix resin. SMC is produced by impregnating a reinforced short fiber with a thermosetting resin composition, molding the impregnated short fiber into a sheet shape, and B-staging the thermosetting resin composition. A fiber-reinforced composite material is mainly produced by heating and compressing SMC in a mold and curing the B-staged thermosetting resin composition. Examples of the thermosetting resin used in SMC include an unsaturated polyester resin, a vinyl ester resin, an epoxy resin, and a phenol resin.

As the epoxy resin compositions used in SMC, the following ones are proposed.

(1) An epoxy resin composition including an epoxy resin having a hydroxyl group, a polyol, and a polyisocyanate compound (Patent Literature 1).

(2) An epoxy resin composition including an epoxy resin, a polyol, a polyisocyanate compound, dicyan diamide, and a certain imidazole compound (Patent Literature 2).

As the epoxy resin compositions used in an adhesive, the following ones are proposed.

(3) A liquid adhesive including an epoxy resin, a curing agent having an activation temperature of 20° C. to 100° C., and a curing agent having an activation temperature of 100° C. to 200° C. (Patent Literature 3).

(4) A reactive hot-melt adhesive including an epoxy resin which is solid at room temperature, an epoxy resin which is liquid at room temperature, a linear polyoxypropylene having an amino terminal, and a latent curing agent (dicyan diamide) (Patent Literature 4).

As the epoxy resin composition for prepreg as a molding material, the following one is proposed.

(5) A resin composition for impregnation including an epoxy resin, a latent curing agent, a resin having a polymerizable unsaturated group, and a polymerization initiator (Patent Literature 5).

As the epoxy resin compositions capable of stabilizing and B-staging an epoxy resin, the following ones are proposed.

(6) An epoxy resin compound including an epoxy resin, 2,5-dimethyl-2,5-hexamethylenediamine, and menthanediamine as a curing agent (Non-Patent Literature 1).

(7) An epoxy resin compound including an epoxy resin, an amino compound such as bis-(4-aminocyclohexyl) methane, 1,3-bis-(aminomethyl)-cyclohexane, or isophorone diamine, dicyan amide, and an imidazole compound (Patent Literature 6).

CITATION LIST

Patent Literature

Patent Literature 1: JP 58-191723 A
Patent Literature 2: JP 4-88011 A
Patent Literature 3: JP 2-88684 A
Patent Literature 4: JP 2-88685 A
Patent Literature 5: JP 2-286722 A
Patent Literature 6: JP 6-166742 A

Non-Patent Literature

Non-Patent Literature 1: p. 155 in "Epoxy Resin Handbook", edited by Masayuki Shimbo, December 25, Showa 62 (1987), published by Nikkan Kogyo Shimbun

SUMMARY OF THE INVENTION

Problem to be Solved by the Invention

The thermosetting resin composition used for SMC needs the following characteristics.

The thermosetting resin composition has low viscosity to sufficiently impregnate a reinforcing fiber substrate composed of reinforced short fibers.

The thermosetting resin composition makes it is easy to detach a film attached to both sides of a SMC sheet after B-staging.

The thermosetting resin composition has processability (flow characteristics, curing rate) after B-staging such that a good fiber-reinforced composite material is obtained by heating and compressing SMC in a mold.

The pot life of the thermosetting resin composition is long, and the storage stability of SMC itself after B stage is good.

However, the epoxy resin composition is characterized in that it is excellent in the mechanical properties (impact resistance etc.) and thermal properties (heat resistance etc.) of a cured product, but it is inherently difficult to be B-staged and has a low curing rate.

Since the epoxy resin compositions of (1) and (2) use a urethane formation reaction, a thickening reaction rate and a B-stage state greatly change due to the influence of moisture in each of the epoxy resin compositions.

Since the liquid adhesive of (3) uses a curing agent having an activation temperature of 20° C. to 100° C. (polyamine, mercaptan, isocyanate, imidazole, polyamide, polysulfide phenol, $BF_3$ complex, ketimine, or the like), the liquid adhesive reaches a gelation state by a curing reaction in a first step. Therefore, the liquid adhesive has low fluidity before a curing reaction in a second step and is difficult to be shape, so that this liquid adhesive cannot be used as an epoxy resin composition for SMC.

Since the reactive hot-melt adhesive of (4) has a high viscosity of a resin composition and cannot obtain good impregnating properties to a reinforcing fiber substrate, this reactive hot-melt adhesive cannot be used as an epoxy resin composition for SMC.

In the production of a prepreg using the resin composition for impregnation of (5), it is described in Patent Literature 5 that a solvent is contained in the resin composition for impregnation, and the removal of the solvent and a part of a curing reaction are performed by heating. This method can be applied to the production of a thin prepreg from which the solvent can be easily removed and in which the temperature unevenness due to the thickness at the time of heating and cooling is small. However, in a thick sheet such as SMC, it is difficult to remove the solvent, and temperature unevenness is large, so as to form a defective object in which the state of a surface is different from the state of an inside after B-staging.

Since the epoxy resin composition of (6) contains 2,5-dimethyl-2,5-hexanediamine, its pot life is short. Further, since the epoxy resin composition contains menthanediamine, its curability is insufficient. Therefore, this epoxy resin composition is not suitable for a resin composition used for SMC.

Since the viscosity of the epoxy resin composition of (7) sharply increases immediately after compounding, it is difficult to control the impregnation properties of the epoxy resin composition to a reinforcing fiber substrate, the impregnation state of the epoxy resin composition to the reinforcing fiber substrate is biased or varied, and the strength and uniformity of a molded article tended to decrease.

The invention provides an epoxy resin composition that is easily B-staged despite containing an epoxy resin inherently difficult to B-stage, has a long pot life, has excellent processability and storage stability after B-staging, and make it possible to obtain a fiber-reinforced composite material having excellent flexural strength and flexural modulus; a molding material that has good processability and storage stability and makes it possible to obtain a fiber-reinforced composite material and excellent flexural strength and flexural modulus; and a fiber-reinforced composite material having excellent flexural strength and flexural modulus.

Means for Solving Problem

As a result of intensive studies, the present inventors have found that the above-mentioned problem can be solved by using a reactive diluent composed of a specific aliphatic epoxy compound and an alicyclic diamine having a specific structure. Based on the finding, the invention has been completed.

The invention has the following aspects.

<1> A molding material including a thickened product of an epoxy resin composition; and a reinforcing fiber; wherein the epoxy resin composition including: including: a component (A): an aromatic epoxy resin; a component (B): an alicyclic diamine; a component (C): an epoxy resin curing agent that is not an alicyclic diamine; and a component (D): an aliphatic epoxy resin, in which, when the viscosity at 25° C. immediately after preparation of the epoxy resin composition is taken as (a) and the viscosity 25° C. after three hours from the preparation is taken as (b), the epoxy resin composition satisfies:

(a)=0.1 to 25 Pa·s;
(b)=0.1 to 25 Pa·s; and
(b)/(a)≤5.

<2> The molding material of <1>, in which the component (B) is an alicyclic diamine having a substituent other than an amino group at β-carbon of the amino group.

<3> The molding material of <1> or <2>, in which the substituent other than the amino group in the component (B) is an alkyl group of 1 to 4 carbon atoms, a benzyl group, or a cyclohexyl group.

<4> The molding material of any one of <1> to <3>, in which the component (B) has an alicyclic skeleton in a molecule, and the amino group is directly bonded to the alicyclic skeleton.

<5> The molding material of any one of <1> to <4>, in which the component (B) is a primary amine having two alicyclic skeletons in a molecule.

<6> The molding material of <5>, in which the component (B) is a compound represented by General Formula (1) below.

[Chem. 1]

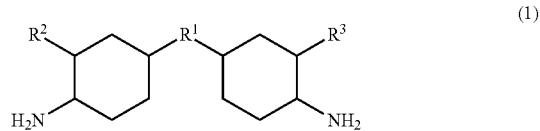

(1)

(In General Formula (1) above, $R^1$ represents a group selected from the group consisting of a direct bond, a methylene group, —C(CH$_3$)$_2$—, —O—, and —SO$_2$—, and $R^2$ and $R^3$ each independently represent a hydrogen atom or an alkyl group of 1 to 4 carbon atoms.)

<7> The molding material of any one of <1> to <6>, in which the component (B) is 3,3'-dimethyl-4,4'-diaminodicyclohexylmethane.

<8> The molding material of any one of <1> to <7>, in which the content of the component (B) in the epoxy resin composition is an amount that active hydrogen thereof is 0.1 to 0.5 equivalents based on a total amount of an epoxy group in the epoxy resin composition.

<9> The molding material of any one of <1> to <7>, in which the content of the component (B) in the epoxy resin composition is an amount that active hydrogen thereof is 0.2 to 0.45 equivalents based on a total amount of an epoxy group in the epoxy resin composition.

<10> The molding material of any one of <1> to <7>, in which the content of the component (B) in the epoxy resin composition is an amount that active hydrogen thereof is 0.25 to 0.4 equivalents based on a total amount of an epoxy group in the epoxy resin composition.

<11> The molding material of any one of <1> to <10>, wherein the epoxy resin composition further including dicyan diamide as the component (C).

<12> The molding material of any one of <1> to <11>, wherein the epoxy resin composition further including a urea compound and/or an imidazole compound.

<13> The molding material of any one of <1> to <12>, in which the component (D) is a glycidyl ether of a monovalent aliphatic alcohol of 4 to 12 carbon atoms which may have an alicyclic skeleton, or a diglycidyl ether of a divalent aliphatic alcohol of 4 to 10 carbon atoms which may have an alicyclic skeleton.

<14> The molding material of any one of <1> to <13>, in which the viscosity of the component (D) at 25° C. is 100 mPa·s or less.

<15> The molding material of any one of <1> to <14>, in which the content of a monofunctional amine is 5 parts by mass or less in the epoxy resin composition based on 100 parts by mass of an epoxy resin included in the epoxy resin composition.

<16> The molding material of any one of <1> to <15>, in which the viscosity of the thickened product of the epoxy resin composition at 23° C. is 5000 to 150000 Pa·s.

<17> A molding material, including:
an epoxy resin composition including a component (A): an aromatic epoxy resin,
a component (B'): a compound having a partial structure represented by General Formula (2) below,
a component (C): an epoxy resin curing agent that is not an alicyclic diamine, and
a component (D): an aliphatic epoxy resin; and
a reinforcing fiber.

[Chem. 2]

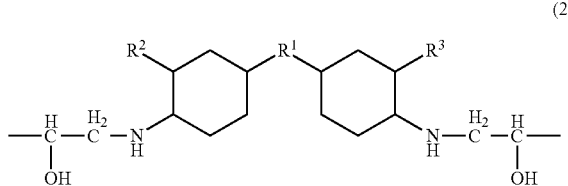

(2)

(In General Formula (2) above, $R^1$ represents a group selected from the group consisting of a direct bond, a methylene group, $-C(CH_3)_2-$, $-O-$, and $-SO_2-$, and $R^2$ and $R^3$ each independently represent a hydrogen atom or an alkyl group of 1 to 4 carbon atoms.)

<18> The molding material of <17>, in which the component (A) contains a component (A'): a liquid aromatic epoxy resin having a viscosity of 0.3 Pas or more at 25° C.
<19> The molding material of any one of <1> to <18>, in which the reinforcing fiber is a carbon fiber.
<20> The molding material of any one of <1> to <19>, in which the molding material is a sheet molding compound.
<21> The molding material of any one of <1> to <19>, in which the molding material is a bulk molding compound.
<22> A fiber-reinforced composite material, in which the fiber-reinforced composite material is a cured product of the molding material of any one of <1> to <21>.
<23> A usage of an epoxy resin composition as a matrix resin composition of a sheet molding compound, the epoxy resin composition, including:
a component (A): an aromatic epoxy resin;
a component (B): an alicyclic diamine;
a component (C): an epoxy resin curing agent that is not an alicyclic diamine; and
a component (D): an aliphatic epoxy resin,
in which, when the viscosity at 25° C. immediately after preparation of the epoxy resin composition is taken as (a) and the viscosity 25° C. after three hours from the preparation is taken as (b), the epoxy resin composition satisfies:
(a)=0.1 to 25 Pa·s;
(b)=0.1 to 25 Pa·s; and
(b)/(a)≤5.
<24> A sheet molding compound, which is obtained by impregnating a reinforcing fiber substrate with an epoxy resin composition and then thickening the epoxy resin composition, the epoxy resin composition comprising:
a component (A): an aromatic epoxy resin;
a component (B): an alicyclic diamine;
a component (C): an epoxy resin curing agent that is not an alicyclic diamine; and
a component (D): an aliphatic epoxy resin,
in which, when the viscosity at 25° C. immediately after preparation of the epoxy resin composition is taken as (a) and the viscosity 25° C. after three hours from the preparation is taken as (b), the epoxy resin composition satisfies:
(a)=0.1 to 25 Pa·s;
(b)=0.1 to 25 Pa·s; and
(b)/(a)≤5.

Effect of the Invention

The epoxy resin composition of the invention is easily B-staged despite containing an epoxy resin inherently difficult to B-stage, has a long pot life, has excellent processability and storage stability after B-staging. Further, according to the epoxy resin composition of the invention, it is possible to obtain a fiber-reinforced composite material having excellent flexural strength and flexural modulus.

The molding material of the invention has good processability and storage stability. Further, according to the molding material of the invention, it is possible to obtain a fiber-reinforced composite material having excellent flexural strength and flexural modulus.

The fiber-reinforced composite material has excellent flexural strength and flexural modulus.

MODES FOR CARRYING OUT THE INVENTION

The following term definitions are applied throughout the present specification and claims.

The "β carbon of an amino group" refers to a carbon atom adjacent to a carbon atom (α carbon) to which an amino group is bonded.

The viscosity of an epoxy resin and an epoxy resin composition at 25° C. is a viscosity measured at 25° C. using an E type viscometer according to JIS Z 8803: 2011.

The viscosity of a thickened product of an epoxy resin composition at 23° C. is a viscosity measured at 23° C. using a B type viscometer according to JIS Z 8803: 2011.

The "reinforcing fiber substrate" represents an aggregate of reinforcing fibers. Specific examples of the reinforcing fiber substrate include a reinforcing fiber bundle, a sheet-shaped product in which chopped reinforcing fiber bundles are two-dimensionally randomly stacked, and the like.

<Epoxy Resin Composition>

The epoxy resin composition of the invention contains a component (A): an aromatic epoxy resin; a component (B): an alicyclic diamine; a component (C): an epoxy resin curing agent that is not an alicyclic diamine; and a component (D): an aliphatic epoxy resin.

The epoxy resin composition of the invention may further contain other components, if necessary.

In the epoxy resin composition of the invention, when the viscosity at 25° C. immediately after preparation of the epoxy resin composition is taken as (a) and the viscosity 25° C. after three hours from the preparation is taken as (b), the epoxy resin composition satisfies the conditions of:
(a)=0.1 to 25 Pa·s;
(b)=0.1 to 25 Pa·s; and
(b)/(a)≤5.

In this way, by suppressing the initial thickening rate after preparation of the epoxy resin composition, the impregnating properties of the epoxy resin composition into the reinforcing fiber substrate is improved, and the epoxy resin composition can be suitably used as a molding material known as SMC, a bulk molding compound (hereinafter also referred to as BMC), or the like. In particular, when the viscosity (b) at 25° C. after 3 hours from the preparation of the epoxy resin composition is 0.5 to 10 Pa·s, in addition to the impregnating properties of the epoxy resin composition into the reinforcing fiber substrate, in the production of SMC and the like, the application accuracy of the epoxy resin composition onto a carrier film tends to be high (weight loss is small), which is more preferable.

Further, by setting the above (b)/(a) to 5 or less, it is possible to reduce a variation in the impregnating properties when manufacturing SMC or the like. If this (b)/(a) exceeds 5, the impregnated state of the epoxy resin composition into the reinforcing fiber substrate tends to be biased or uneven, and thus the strength and uniformity of a molded article tend to decrease. The (b)/(a) is preferably 4 or less, and further preferably 3 or less.

(Component (A))

The component (A) is an aromatic epoxy resin.

The component (A) is a component that adjusts the viscosity of the epoxy resin composition of the invention to the above range and increases the impregnation properties of the epoxy resin composition into the reinforcing fiber substrate. In order to further improve the impregnating properties, it is preferable that the component (A) is in a liquid state at 25° C.

Further, by using the component (A) having a viscosity of 0.3 Pa·s or more at 25° C., it is possible to enhance the mechanical properties (flexural strength, flexural modulus) and thermal properties (heat resistance) of a fiber-reinforced composite material obtainable from the epoxy resin composition of the invention. Further, since the component (A) has an aromatic ring, it is easy to adjust the mechanical properties of the fiber-reinforced composite material to a desired range.

Examples of the component (A) include glycidyl ethers of bisphenols (bisphenol A, bisphenol F, bisphenol AD, halogen substituted products thereof, and the like); glycidyl ethers of polyhydric phenols obtained by a condensation reaction of phenols and aromatic carbonyl compounds; glycidyl ethers of polyhydric alcohols (polyoxyalkylene bisphenol A and the like); and polyglycidyl compounds derived from aromatic amines.

As the component (A), a bisphenol type epoxy resin is preferable from the viewpoint that the viscosity of the epoxy resin composition can be easily adjusted to a viscosity suitable for impregnation into a reinforcing fiber substrate and the mechanical properties of the fiber-reinforced composite material can be easily adjusted to a desired range.

As the bisphenol type epoxy resin, a bisphenol A type epoxy resin is preferable from the viewpoint that the fiber-reinforced composite material has good heat resistance and chemical resistance. Further, as the bisphenol type epoxy resin, a bisphenol F type epoxy resin is more preferable from the viewpoint that the viscosity of the bisphenol F type epoxy resin is lower than that of the bisphenol A type epoxy resin having the same molecular weight and the elastic modulus of the fiber reinforced composite material is high.

The component (A) may be a trifunctional or higher epoxy resin. The trifunctional epoxy resin and the tetrafunctional epoxy resin can further improve the heat resistance of the fiber-reinforced composite material without significantly changing the viscosity of the epoxy resin composition.

Examples of commercially available products of bifunctional component (A) are as follows.

jER 825, 827, 828, 828 EL, 828 XA, 806, 806 H, 807, 1750, YL 6810 (registered trademark), manufactured by Mitsubishi Chemical Corporation;

EPICLON 840, 840-S, 850, 850-S, EXA-850CRP, 850-LC, 830, 830-S, 835, EXA-830CRP, EXA-830LVP, EXA835LV (registered trademark), manufactured by DIC Corporation;

EPOTOTE YD-127, YD-128, YD-128 G; YD-128 S, YD-128 CA, YDF-170 (registered trademark), manufactured by NIPPON STEEL & SUMIKIN CHEMICAL CO., LTD; and RE-3035-L, RE-310S, GAN, GOT, manufactured by Nippon Kayaku Co., Ltd.

Examples of commercially available products of trifunctional or higher component (A) are as follows.

jER 152, 604, 630, 630 LSD (registered trademark), manufactured by Mitsubishi Chemical Corporation;

YH-434, YH434L manufactured by NIPPON STEEL & SUMIKIN CHEMICAL CO., LTD;

SUMIEPDXY ELM 434, ELM 100, ELM 120 (registered trademark), manufactured by NIPPON STEEL & SUMIKIN CHEMICAL CO., LTD; and TETRAD-X manufactured by Mitsubishi Gas Chemical Company, Inc.

The component (A) may be used alone, and may also be used as a combination of two or more kinds.

The upper limit of the viscosity of component (A) at 25° C. may be any viscosity as long as the viscosity (a) at 25° C. immediately after preparation of the epoxy resin composition is 0.1 to 25 Pa·s, is preferably 500 Pa·s or less, and more preferably 400 Pa·s or less. Further, the lower limit of the viscosity of component (A) at 25° C. is preferably 0.2 Pa·s or more, and more preferably 0.5 Pa·s or more.

Here, the "immediately after preparation" refers to a state after mixing at 25° C. for 30 minutes in the presence of all the components (A) to (D). In a case where the components (A), (C) and (D) are previously mixed and the component (B) is added, the "immediately after preparation" refers to a state of being mixed for 30 minutes after the addition of the component (B).

The content of the component (A) in the epoxy resin composition of the invention may be set such that the viscosity at 25° C. immediately after preparation of the epoxy resin composition is 0.1 to 25 Pa·s, and varies depending on the kind of the component (A).

The content of the component (A) is generally 20 to 99 parts by mass, and preferably 60 to 95 parts by mass with respect to a total amount of an epoxy resin included in the epoxy resin composition of 100 parts by mass. When the content of the component (A) is within the above range, the viscosity of the epoxy resin composition can be easily adjusted to the viscosity range, and the impregnating properties of the epoxy resin composition into the reinforcing fiber substrate are enhanced. In addition, the mechanical properties (flexural strength, flexural modulus) and thermal properties (heat resistance) of the fiber-reinforced composite material are enhanced.

(Component (B))

The component (B) is an alicyclic diamine.

The component (B) is a component that acts as a thickener in the epoxy resin composition of the invention. Among the above, a diamine having one or two cyclohexane rings in the molecule is preferable because it can increase the pot life of the epoxy resin composition of the invention and tend to improve the storage stability of B-staging.

Further, the component (B) has an alicyclic skeleton in the molecule, and the amino group is directly bonded to the alicyclic skeleton. Those in which the amino group is directly bonded to the alicyclic skeleton are more remarkable in this tendency.

The component (B) is a primary amine having two alicyclic skeletons in the molecule.

Further, when the component (B) has a substituent other than the amino group at the β carbon of the amino group, the reaction of active hydrogen of the amino group tends to be inhibited, so that the pot life of the epoxy resin composition can be made longer by using these.

From the viewpoint of increasing the pot life of the epoxy resin composition, the substituent other than the above-mentioned amino group is preferably an alkyl group of 1 to 4 carbon atoms, a benzyl group, or a cyclohexyl group, more preferably an alkyl group of 1 to 4 carbon atoms, and particularly preferably a methyl group, an ethyl group, or an isopropyl group.

Since the component (B) has the above characteristics, the component (B) is preferably a compound represented by General Formula (1) below.

[Chem. 3]

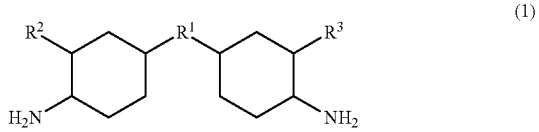

(1)

(In General Formula (1) above, $R^1$ represents a group selected from the group consisting of a direct bond, a methylene group, —C(CH$_3$)$_2$—, —O—, and —SO$_2$—, and $R^2$ and $R^3$ each independently represent a hydrogen atom or an alkyl group of 1 to 4 carbon atoms.)

Specific examples of the compound represented by General Formula (1) above include 3,3'-dimethyl-4,4'-diaminodicyclohexylmethane, 3,3'-diethyl-4,4'-diaminodicyclohexylmethane, bis(4-amino-3-methyl-5-ethylcyclohexyl)methane, 3,3'-diethyl-4,4'-diaminodicyclohexylmethane, 3,3'5,5'-tetramethyl-4,4'-diaminodicyclohexylmethane, and 4,4'-diaminodicyclohexylmethane.

The component (B) may be used alone or a combination of two or more, but, from the view point of fast curability after B-staging, is particularly preferably 3,3'-dimethyl-4,4'-diaminodicyclohexylmethane.

Further, for the purpose of adjusting the thickening properties as a molding material of the epoxy resin composition of the invention, the component (B) can be used in combination with a monofunctional amine such as aniline, benzyl amine, or cyclohexyl amine together with the above-mentioned alicyclic diamine.

However, in order to avoid the deterioration of the pot life of the epoxy resin composition, the content of a monofunctional amine is preferably 0.01 parts by mass to 5 parts by mass, and more preferably 0.1 parts by mass to 2 parts by mass, based on 100 parts by mass of the epoxy resin included in the epoxy resin composition.

The content of the component (B) is an amount that active hydrogen thereof is 0.1 to 0.5 equivalents based on a total amount of an epoxy group in the epoxy resin composition, preferably an amount that active hydrogen thereof is 0.20 to 0.45 equivalents, a more preferably an amount that active hydrogen thereof is 0.25 to 0.4 equivalents. When the content of the component (B) is not less than the lower limit of the above range, the B-staging proceeds sufficiently. When the content of the component (B) is not more than the upper limit of the above range, fluidity does not decrease too much during heat compression molding.

(Component (C))

The component (C) is an epoxy resin curing agent that is not an alicyclic diamine.

Examples of the component (C) include amine compounds other than the above-mentioned component (B), acid anhydride, and boron chloride amine complex.

These compounds can be used by appropriately selecting one or two or more. However, from the viewpoint of compatibility between pot life and reactivity during curing, the component (C) is preferably a compound that is solid at 25° C. and is liquid during curing, and particularly preferably dicyandiamide. The dicyandiamide has good storage stability and high adhesiveness to a reinforcing fiber.

The content of the component (C) is preferably 1 to 20 parts by mass, and more preferably 3 to 10 parts by mass, based on 100 parts by mass of the entire epoxy resin included in the epoxy resin composition. When the content of the component (C) is not less than the lower limit of the above-mentioned range, a sufficient curing rate can be obtained. When the content of the component (C) is not more than the upper limit of the above-mentioned range, the water absorption rate of the fiber-reinforced composite material is suppressed, and the deterioration of heat resistance is suppressed.

(Component (D))

The component (D) is an aliphatic epoxy resin.

The component (D) is a component mainly acting as a reactive diluent.

The bifunctional component (D) is also a component that enhances the flexural properties of the fiber-reinforced composite material.

The monofunctional component (D) is also a component that can lower the viscosity of the epoxy resin composition and also increases the impregnating properties of the epoxy resin composition into the reinforcing fiber substrate without greatly impairing the flexural properties of the fiber-reinforced composite material.

As the component (D), any one of the monofunctional component (D) and the bifunctional component (D) may be used, and both of them may also be used. When both the monofunctional component (D) and the bifunctional component (D) are used, the viscosity of the epoxy resin composition can be lowered while maintaining the flexural characteristics of the fiber-reinforced composite material, and the impregnating properties of the epoxy resin composition into the reinforcing fiber substrate can be enhanced. In addition, it is possible to achieve both appropriate viscosity at the time of impregnation into the reinforcing fiber substrate and fluidity of the epoxy resin composition at the time of heat compression molding.

In order to exhibit the characteristics of this component (D), the upper limit value of the viscosity of the component (D) at 25° C. is preferably 100 mPa·s or less, and more preferably 80 mPa·s or less. The lower limit value of the viscosity is not particularly limited, and the lower the viscosity, the more preferable. However, the object of the invention can be sufficiently attained if the viscosity is particularly low at about 30 mPa·s. Specifically, the lower limit value of the viscosity is preferably 1 mPa·s to 100 mPa·s, more preferably 1 mPa·s to 30 mPa·s, and further preferably 5 mPa·s to 25 mPa·s.

The bifunctional component (D) is preferably a glycidyl ether of a divalent aliphatic alcohol which may have an alicyclic skeleton, more preferably a diglycidyl ether of a divalent aliphatic alcohol of 4 to 10 carbon atoms which may have an alicyclic skeleton an in which a hydroxyl group is bonded to a linear or branched hydrocarbon group, and further preferably a diglycidyl ether of a divalent aliphatic alcohol of 6 to 8 carbon atoms which may have an alicyclic skeleton an in which a hydroxyl group is bonded to a linear or branched hydrocarbon group.

Examples of the divalent aliphatic alcohol include 1,4-butanediol, 3-methyl-1,5-pentanediol, neopentyl glycol, 1,6-hexanediol, 1,9-nonanediol, and cyclohexane dimethanol.

The monofunctional component (D) is preferably a glycidyl ether of a monovalent aliphatic alcohol which may have an alicyclic skeleton, more preferably a diglycidyl ether of a monovalent aliphatic alcohol of 4 to 12 carbon atoms which may have an alicyclic skeleton an in which a hydroxyl group is bonded to a linear or branched hydrocarbon group, and further preferably a diglycidyl ether of a monovalent aliphatic alcohol of 6 to 8 carbon atoms which may have an alicyclic skeleton an in which a hydroxyl group is bonded to a linear or branched hydrocarbon group.

Examples of the monovalent aliphatic alcohol include butyl alcohol, isobutyl alcohol, s-butyl alcohol, 2-ethylhexanol, stearyl alcohol, isostearyl alcohol, and lauryl alcohol.

The component (D) may be used alone, and may also be used as a combination of two or more.

The content of the component (D) is preferably 1 to 30 parts by mass, and more preferably 5 to 20 parts by mass, based on 100 parts by mass of the sum of the component (A) and the component (D). When the content of the component (D) is not less than the lower limit of the above range, the impregnating properties of the epoxy resin composition and the processability of the molding material are excellent. When the content of the component (D) is not more than the upper limit of the above range, the heat resistance of the fiber-reinforced composite material is not deteriorated.

(Other Components)

As other components which may be contained in the epoxy resin composition of the invention, a curing accelerator, an inorganic filler, an internal release agent, an organic pigment, an inorganic pigment, and epoxy resins other than the components (A) and (D) (hereinafter also referred to as other epoxy resins) are exemplified.

The curing accelerator is preferably used for the following reasons.

In the case of using dicyandiamide as the component (C), since the dicyandiamide is dispersed in the epoxy resin at room temperature, the epoxy resin composition has very excellent storage stability, but in the case of performing a curing with dicyandiamide alone, a curing temperature is about 200° C. Here, when the dicyandiamide is used in combination with an appropriate curing accelerator, the reaction initiation temperature can be lowered without greatly deteriorating storage stability and the epoxy resin composition can be cured for a short time. In addition, the mechanical properties (flexural strength, flexural modulus) and thermal properties (heat resistance) of the fiber-reinforced composite material can also be improved.

The curing accelerator is preferably a urea compound from the viewpoint of improving the mechanical properties (flexural strength, flexural modulus) of the fiber-reinforced composite material, and is preferably an imidazole compound from the viewpoint of improving the thermal properties (heat resistance) of the fiber-reinforced composite material.

Examples of the urea compound include 3-phenyl-1,1-dimethylurea, 3-(3,4-dichlorophenyl)-1,1-dimethylurea, 3-(3-chloro-4-methylphenyl)-1,1-dimethylurea, 2,4-bis(3,3-dimethylureido) toluene, and 1,1'-(4-methyl-1,3-phenylene) bis(3,3-dimethylurea).

Examples of the imidazole compound include imidazole, 2-phenylimidazole, 2-phenyl-4-methylimidazole, 2-methylimidazole, 2-undecylimidazole, 2-heptadecylimidazole, 1,2-dimethylimidazole, 2-ethyl-4-methylimidazole, 2,4-diamino-6-[2'-methylimidazolyl-(1')]-ethyl-s-triazine, 2,4-diamino-6-[2'-methylimidazolyl-(1')]-ethyl-s-triazine isocyanuric acid adduct, 2-phenyl-4,5-dihydroxymethylimidazole, and 2-phenyl-4-methyl-5-hydroxymethylimidazole.

Examples of the inorganic filler include calcium carbonate, aluminum hydroxide, clay, barium sulfate, magnesium oxide, glass powder, hollow glass beads, and aerosil.

Examples of the internal release agent include carnauba wax, zinc stearate, and calcium stearate.

As other epoxy resins which are in a semi-solid or solid state at 25° C., an epoxy resin having an aromatic ring is preferable, and a bifunctional epoxy resin is more preferable. Besides the bifunctional epoxy resin, various epoxy resins may be contained in the thermosetting resin composition of the invention for the purpose of improving heat resistance and viscosity. In order to improve heat resistance, a polyfunctional epoxy resin, a novolak type epoxy resin, and an epoxy resin having a naphthalene skeleton are effective.

(Method of Preparing Epoxy Resin Composition)

The epoxy resin composition of the invention can be prepared by a conventionally known method. For example, the epoxy resin composition may be prepared by simultaneously mixing the respective components, and may also be prepared by preparing a mater batch in which components (A), (B), (C), and the like are suitably dispersed in advance and using this mater batch. In addition, when the temperature in the system rises due to shear heating caused by kneading or the like, it is preferable to devise a way not to raise the temperature during kneading, such as adjusting the kneading rate or water-cooling the kneading kettle. Examples of the kneading apparatus include a mortar machine, an attritor, a planetary mixer, a dissolver, a three roll, a kneader, a universal stirrer, a homogenizer, a homodispenser, a ball mill, and a bead mill. These kneading apparatuses may be used a combination of two or more.

(Application)

The epoxy resin composition of the invention is suitable as a matrix resin for a fiber-reinforced resin material of a molding material which is an intermediate material used for manufacturing a fiber-reinforced composite material, particularly as a matrix resin for SMC and a matrix resin for BMC.

Since the epoxy resin composition of the invention has low viscosity and good impregnating properties, it can also be used as a matrix resin composition in a fiber-reinforced composite material of a RTM production method. Further, since the epoxy resin composition of the invention has high adhesiveness to a resin cured product, it can also be used as an adhesive between fiber-reinforced composite materials.

(Function and Effect)

In the above-described epoxy resin composition of the invention, this epoxy resin composition, which is a matrix resin composition of the molding material containing the component (A), the component (B), the component (C) and the component (D), suppressing an initial thickening rate after the preparation of the epoxy resin composition, and represented by SMC, is easily B-staged despite containing an epoxy resin inherently difficult to B-stage as a main component, has a long pot life, has excellent processability (fluidity, curing rate) and storage stability after B-staging, so as to obtain a fiber-reinforced composite material having excellent mechanical properties (flexural strength, flexural modulus).

<Molding Material>

The molding material of the invention contains a thickened product of the epoxy resin composition of the invention, and a reinforcing fiber.

Examples of the molding material include a prepreg, a tow prepreg, SMC, and BMC. Since the viscosity characteristics of the epoxy resin composition of the invention and the physical properties of a thickened product thereof are suitable for SMC or BMC, as the molding material, SMC or BMC is preferable, and SMC is particularly preferable.

(Thickened Product of Epoxy Resin Composition)

The thickened product of the epoxy resin composition is obtained by thickening the epoxy resin composition of the invention, that is, B-staging the epoxy resin composition of the invention.

The thickened product of the epoxy resin composition can be obtained, for example, as follows.

After a reinforcing fiber substrate is impregnated with the epoxy resin composition of the invention by a well-known method suitable for the form of the reinforcing fiber substrate, the reinforcing fiber substrate impregnated with the epoxy resin composition is heated to a temperature of about room temperature to 80° C. for several hours to several days, or is left at a temperature of about 200° C. for several seconds to several minutes, so that the component (B) reacts with the component (A) and component (D) in the epoxy resin composition and the epoxy group of an optionally blended epoxy resin to B-stage the epoxy resin composition.

The reaction conditions of the epoxy group of the epoxy resin with the component (B) are preferably selected such that the viscosity of the thickened product of the epoxy resin composition obtained after the reaction at 23° C. is within the range to be described later.

The viscosity of the thickened product of the epoxy resin composition at 23° C. is preferably 5000 to 150000 Pa·s, and more preferably 5000 to 100000 Pa·s. When the viscosity of the thickened product of the epoxy resin composition at 23° C. is not less than the lower limit of the above range, a surface tackiness decreases during the treatment of the molding material. When the viscosity of the thickened product of the epoxy resin composition at 23° C. is not more than the upper limit of the above range, flow characteristics is improved during heat compression molding.

It is preferable that the molding material containing the epoxy resin composition of the invention and the reinforcing fiber and thickened as described above has the following configuration, for example.

The molding material includes: an epoxy resin composition containing a component (A): an aromatic epoxy resin, a component (B'): a compound having a partial structure represented by General Formula (2) below, a component (C): an epoxy resin curing agent that is not an alicyclic diamine, and a component (D): an aliphatic epoxy resin; and a reinforcing fiber.

[Chem. 4]

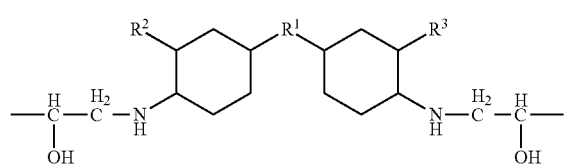

(2)

(In General Formula (2) above, $R^1$ represents a group selected from the group consisting of a direct bond, a methylene group, —C(CH$_3$)$_2$—, —O—, and —SO$_2$—, and $R^2$ and $R^3$ each independently represent a hydrogen atom or an alkyl group of 1 to 4 carbon atoms.)

In this case, the component (A') which is a liquid aromatic epoxy resin having a viscosity at 25° C. of 0.3 Pa·s or more is contained as the component (A), whereby a fiber-reinforced composite material obtained from this molding material tends to have good mechanical properties (flexural strength, flexural modulus) and thermal properties (heat resistance).

(Reinforcing Fiber)

As the reinforcing fiber, various reinforcing fibers can be adopted according to the use and purpose of the molding material. Examples of the reinforcing fiber include carbon fiber (including graphite fiber, the same applies below), aramid fiber, silicon carbide fiber, alumina fiber, boron fiber, tungsten carbide fiber, and glass fiber. From the viewpoint of the mechanical properties of the fiber-reinforced composite material, carbon fiber and glass fiber are preferable, and carbon fiber is particularly preferable.

The reinforcing fiber is used in a state of a reinforcing fiber bundle consisting of monofilaments usually in the range of 3000 to 60000. In a case where the reinforcing fibers are present in the molding material while maintaining the shape of the reinforcing fiber bundle, there is also a case where the reinforcing fibers are divided into bundles of smaller fibers. In SMC and BMC, the reinforcing fibers are usually divided into fewer bundles.

As the reinforcing fibers in SMC and BMC, a chopped reinforcing fiber bundle composed of short fibers are preferable. The length of the short fiber is preferably 0.3 to 10 cm, and more preferably 1 to 5 cm. When the length of short fiber is 0.3 cm or more, a fiber-reinforced composite material having good mechanical properties can be obtained. When the length of the short fiber is 10 cm or less, SMC or BMC having good flow characteristics during hot compression molding can be obtained.

As the reinforcing fiber substrate in SMC, a sheet-shaped product in which chopped reinforcing fiber bundles are two-dimensionally randomly stacked is more preferable.

(SMC)

The SMC contains a thickened product of the epoxy resin composition of the invention and a reinforcing fiber.

The SMC is produced, for example, by sufficiently impregnating a sheet-shaped product of chopped reinforcing fiber bundles with the epoxy resin composition of the invention to thicken the epoxy resin composition.

As the method of impregnating the sheet-shaped product of chopped reinforcing fiber bundles with the epoxy resin composition of the invention, various conventionally known methods can be adopted. For example, the following method can be exemplified.

Two films uniformly coated with the epoxy resin composition of the invention are prepared. Chopped reinforcing fiber bundle are randomly spread on the coated surface of the epoxy resin composition of one film to form a sheet-shaped product. The coated surface of the epoxy resin composition of the other film is attached onto the sheet-shaped product, and the epoxy resin composition is pressed and impregnated into the sheet-shaped product. Thereafter, the viscosity of the epoxy resin composition is increased, and thus the tackiness on the surface of the SMC is suppressed, thereby obtaining an SMC suitable for molding work.

(BMC)

The BMC contains a thickened product of the epoxy resin composition of the invention and a reinforcing fiber.

The BMC is produced, for example, by sufficiently mixing chopped reinforcing fiber bundles with the epoxy resin composition of the invention in a bulk shape to thicken the epoxy resin composition.

As the method of mixing chopped reinforcing fiber bundles with the epoxy resin composition of the invention in a bulk shape, various conventionally known methods can be adopted. From the viewpoint of productivity such as the impregnation property of the chopped reinforcing fiber bundles with the epoxy resin composition or the dispersibility of fibers, a mixing method using a pressure kneader is preferable. If necessary, the mixing method using a pressure kneader may be carried out while heating. The heating temperature is preferably equal to or lower than temperature at which the epoxy resin starts curing, and more preferably from 10 to 35° C. The pressure at the time of mixing by the pressure kneader is not particularly required to be equal to or higher than atmospheric pressure, but when the viscosity of the epoxy resin composition is high, the epoxy resin composition takes in air and kneads, and when it is difficult to impregnate the chopped reinforcing fiber bundles with the epoxy resin composition, the pressure may be equal to or higher than atmospheric pressure.

After obtaining the bulk-shaped structure, the tackiness on the surface of BMC is suppressed by thickening the epoxy resin composition, and thus BMC suitable for molding work can be obtained.

(Function and Effect)

In the above-described molding material of the invention, since the molding material contains a thickened product of the epoxy resin composition of the invention and a reinforcing fiber, the molding material has good processability and storage stability, and thus a fiber-reinforced composite material excellent in flexural strength and flexural modulus can be obtained.

<Fiber-Reinforced Composite Material>

The fiber-reinforced composite material of the invention is a cured product of the molding material of the invention.

The fiber-reinforced composite material of the invention is produced by heating and molding a molding material such as SMC or BMC to cure the epoxy resin composition of the invention which has been B-staged.

As the method of producing a fiber-reinforced composite material using SMC, the following methods can be exemplified.

One SMC or a plurality of SMCs are set between a pair of molds. SMC is heated and compressed at 120 to 230° C. for 2 to 60 minutes to cure the epoxy resin composition to obtain a fiber reinforced composite material as a molded product. A honeycomb structure such as a corrugated cardboard may be used as a core material, and SMC may be disposed on both sides or one side of the honeycomb structure.

As the method of producing a fiber reinforced composite material using BMC, a method by compression molding, transfer molding, injection molding or the like can be exemplified. Since the epoxy resin composition of the invention often has high viscosity near room temperature, even a molded product having a complicated shape can be obtained in a short time by adopting a compression molding method in which BMC having a predetermined shape is press-fitted into a mold or the like, and then heated and compressed to cure the epoxy resin composition.

(Function and Effect)

In the above-described fiber reinforced composite material of the invention, since this fiber reinforced composite material is a cured product of the molding material of the invention, it is excellent in flexural strength and flexural modulus.

OTHER EMBODIMENTS

The invention is not limited to the above-described embodiments, and various modifications are possible within the scope of the claims. Embodiments obtained by appropriately combining the technical means described in the above embodiments with different embodiments are also included in the technical scope of the invention.

EXAMPLES

Hereinafter, the invention will be described in detail with reference to Examples, but the invention is not limited thereto.

<Components>

(Component (A))

827: bisphenol A type liquid epoxy resin (jER (registered trademark) 827, manufactured by Mitsubishi Chemical Corporation, viscosity at 25° C.: 10 Pa·s).

630: triglycidyl-p-aminophenol (jER (registered trademark) 630, manufactured by Mitsubishi Chemical Corporation, viscosity at 25° C.: 0.7 Pa·s).

604: tetraglycidyl diamino diphenyl methane (jER (registered trademark) 604, manufactured by Mitsubishi Chemical Corporation, viscosity at 25° C.: 360 Pa·s).

(Component (D))

YED 188: 2-ethylhexyl glycidyl ether (YED 188, manufactured by Mitsubishi Chemical Corporation).

YED 216 M: 1,6-hexanediol diglycidyl ether (YED 216 M, manufactured by Mitsubishi Chemical Corporation).

(Component (B))

113: 3,3'-dimethyl-4,4'-diaminodicyclohexylmethane (jER Cure (registered trademark) 113, manufactured by Mitsubishi Chemical Corporation).

PACM: 4,4'-diaminodicyclohexylmethane (Amicure (registered trademark) PACM, manufactured by Air Products and Chemicals, Inc.).

(Thickener Other than Component (B))

J-D 230: poly (alkylene oxide) diamine (Mw=230) (Jeffamine D-230, manufactured by Huntsman Co., Ltd.).

MDA: 4,4'-di aminodiphenylmethane (MDA-220, manufactured by Mitsui Chemicals Inc.).

(Component (C))

1400 F: dicyandiamide (DICYANEX (registered trademark) 1400 F, manufactured by Air Products and Chemicals, Inc.).

(Other Components)

DCMU: 3-(3,4-dichlorophenyl)-1,1-dimethylurea (DCMU 99, manufactured by Hodogaya Chemical Co., Ltd.).

2 MZA-PW: 2,4-diamino-6-[2'-methylimidazolyl-(1')]-ethyl-s-triazine (2 MZA-PW, manufactured by Shikoku Chemicals Corporation).

4,4'-DDS: 4,4'-diaminodiphenylsulfone (Seika Cure S, manufactured by Wakayama Seika Industry Co., Ltd.).

BYK 9920: resin modifier (BYK 9920, manufactured by BYK Corporation).

FB-962: internal releasing agent (FB-962, manufactured by Daikin Industries, Ltd.).

Methyl stearate: methyl stearate (manufactured by Tokyo Chemical Industry Co., Ltd.).

Preparation of Epoxy Resin Composition

Example 1

83 parts by mass of 827, 4 parts by mass of 1400 F, and 1 part by mass of DCMU were mixed in advance, and kneaded with a triple roll. 5 parts by mass of YED 188, 12 parts by mass of YED 216 M, and 11.7 parts by mass of 113 were mixed with this mixed resin to obtain an epoxy resin composition.

Examples 2 to 16

Epoxy resin compositions were obtained in the same manner as in Example 1 except that the composition of Table 1 was used.

Comparative Example 1

100 parts by mass of 827, 4 parts by mass of 1400 F, and 1 part by mass of DCMU were mixed in advance, and kneaded with a triple roll. 6.5 parts by mass of 113 was mixed with this mixed resin to obtain an epoxy resin composition.

Comparative Example 2

83 parts by mass of 827, 4 parts by mass of 1400 F, and 1 part by mass of DCMU were mixed in advance, and kneaded with a triple roll. 5 parts by mass of YED 188, 12 parts by mass of YED 216 M, and 10.4 parts by mass of PACM were mixed with this mixed resin to obtain an epoxy resin composition.

Comparative Example 3

83 parts by mass of 827, 4 parts by mass of 1400 F, and 1 part by mass of DCMU were mixed in advance, and kneaded with a triple roll. 5 parts by mass of YED 188, 12 parts by mass of YED 216 M, and 11.8 parts by mass of J-D 230 were mixed with this mixed resin to obtain an epoxy resin composition.

Comparative Example 4

83 parts by mass of 827, 4 parts by mass of 1400 F, and 1 part by mass of DCMU were mixed in advance, and kneaded with a triple roll. 5 parts by mass of YED 188, 12 parts by mass of YED 216 M, and 9.8 parts by mass of MDA were mixed with this mixed resin to obtain an epoxy resin composition.

(Evaluation of Pot Life)

The viscosity of the epoxy resin composition at 25° C. immediately after preparation and the viscosity of the epoxy resin composition at 25° C. after 3 hours from the preparation were measured using an E type viscometer (RE-80U, manufactured by Toki Sangyo Co., Ltd.) according to JIS Z 8803: 2011. Pot life was determined according to the following criteria. Results thereof are shown in Tables 1 and 2.

Here, the "immediately after preparation" refers to a state in which the components (A), (C), and (D) at 25° C. were all mixed in advance, the component (B) at 25° C. was added all at once, and then these all components were mixed at 25° C. for 30 minutes.

A (good): a case where the viscosity immediately after preparation and the viscosity after 3 hours is 0.1 to 25 Pa·s and the viscosity after 3 hours is 5 times or less of the viscosity immediately after preparation is defined as A.

B (poor): a case where the viscosity immediately after preparation and the viscosity after 3 hours is less than 0.1 Pa·s or more than 25 Pa·s or the viscosity after 3 hours is more than 5 times of the viscosity immediately after preparation is defined as B.

(Evaluation of B-Staging)

The viscosity of the epoxy resin composition at 23° C. 5 days after the preparation was measured using a B type viscometer (DV2T, manufactured by EKO Instruments.) according to JIS Z 8803: 2011. B-staging was determined according to the following criteria. Results thereof are shown in Tables 1 and 2.

A (good): a case where the viscosity of the epoxy resin composition at 23° C. 5 days after the preparation is 5000 to 150000 Pa·s is defined as A.

B (poor): a case where the viscosity of the epoxy resin composition at 23° C. 5 days after the preparation is less than 5000 Pa·s or more than 150000 Pa·s is defined as B.

(Evaluation of Fast Curability)

2 g of the epoxy resin composition was weighed, and the gelation time of the epoxy resin composition at 140° C. after 5 days was measured using a gel time tester (No. 153, manufactured by Yasuda Seiki Co., Ltd.). Fast curability was determined according to the following criteria. Results thereof are shown in Tables 1 and 2.

A (good): a case where the gelation time is 5 minutes or less is defined as A.

B (poor): a case the gelation time is more than 5 minutes is defined as B.

<Manufacture of Resin Plate>

The epoxy resin composition was defoamed under reduced pressure, and then poured into a mold. The resultant was cured at 23° C., and then heated to 140° C. to obtain a resin plate having a thickness of 2 mm.

(Evaluation of Heat Resistance)

The resin plate was cut to a width of 1 cm and a length of 5 cm to prepare a test piece. With respect to the test piece, when measurement was carried out using a dynamic viscoelasticity measuring apparatus (EXSTAR DMS 6100, manufactured by SII Nanotechnology Inc.) under the measurement conditions of a frequency of 10 Hz, a temperature range of 30° C. to 180° C., a heating rate of 2° C./min, and a bifurcated bending mode, the temperature at which a temperature-tan δ curve shows a maximum value is defined as glass transition temperature (Tg). The higher the Tg, the better the heat resistance.

<Manufacture of SMC>

SMC was prepared using each of the epoxy resin compositions obtained in Example 2 and Examples 4 to 16.

The epoxy resin composition was applied onto a polyethylene carrier film using a doctor blade so as to have a thickness of 1.0 mm. Chopped carbon fiber bundles obtained by cutting carbon fiber bundles (TR 50 S 15 L, manufactured by Mitsubishi Rayon Co., Ltd.) having a filament number of 15000 to a length of 25 mm were scattered onto the epoxy resin composition such that carbon fibers are substantially uniform to have a weight per unit area of approximately 1200 g/m$^2$, or such that the direction of carbon fibers is random.

The same epoxy resin composition was applied onto a polyethylene carrier film using a doctor blade so as to have a thickness of 1.0 mm.

The chopped carbon fiber bundle was sandwiched between two carrier films such that the side of the epoxy resin composition was an inside. This was passed between the rolls and pressed to impregnate the chopped carbon fiber bundle with the epoxy resin composition to obtain an SMC precursor. The SMC precursor was left at room temperature (23° C.) for 168 hours to sufficiently thicken the epoxy resin composition in the SMC precursor, so as to obtain SMC in which the chopped carbon fiber bundle was impregnated well with the epoxy resin composition. The amount of resin in SMC was 1200 g/m² (that is, the content of carbon fibers in SMC was 50% by mass).

<Production of Fiber-Reinforced Composite Material>

SMC was stacked into 2 plies, charged into a mold for molding at a charge rate (ratio of area of SMC to area of mold) of 65%, and heated and compressed for 5 minutes under the conditions of a mold temperature of 140° C. and a pressure of 8 MPa to cure the epoxy resin, so as to obtain a plate-like fiber reinforced composite material (CFRP molded plate) having a thickness of about 2 mm and 300 mm square.

(Evaluation of Heat Resistance)

The CFRP molded plate was cut to a length of 55 mm and a width of 12.7 mm to prepare a test piece. With respect to the test piece, when measurement was carried out using a dynamic viscoelasticity measuring apparatus (Q 800, manufactured by TA Instruments) under the measurement conditions of a frequency of 1 Hz heating rate of 5° C./min, and a bifurcated bending mode, the temperature at which a temperature-tan δ curve shows a maximum value is defined as glass transition temperature (Tg). The higher the Tg, the better the heat resistance.

(Evaluation of Flexural Characteristics)

The CFRP molded plate was cut to a length of 110 mm and a width of 25 mm, and the cut surface was treated with sandpaper #1200 to prepare a test piece. With respect to the test piece, a bending test was carried out with a three-point bending jig by using a universal testing machine (Instron (registered trademark) 4465, manufactured by Instron Corporation) and analysis software Bluehill under an environment of a temperature of 23° C. and a humidity of 50% RH, and flexural strength, flexural modulus and flexural elongation were calculated. Measurement was carried out using a total of 12 test pieces, and the average value thereof was adopted. Measurement conditions are as follows. D is a thickness of the specimen, and L is a distance between supports.

(Measurement Conditions)
Indenter R=3.2,
Support R=1.6,
Distance between supports L [mm]=40×D, and
Crosshead speed [mm/min]=0.01×L×L/6/D.

TABLE 1

| Epoxy resin composition | | Examples | | | | | | | | |
|---|---|---|---|---|---|---|---|---|---|---|
| (parts by mass) | | 1 | 2 | 3 | 4 | 5 | 6 | 7 | 8 | 9 |
| (A) | 827 | 83 | 85 | 80 | 40 | 83 | 83 | 85 | 85 | 40 |
| | 630 | — | — | 10 | — | — | — | — | — | — |
| | 604 | — | — | — | 40 | — | — | — | — | 40 |
| (D) | YED188 | 5 | — | — | — | 5 | 5 | — | — | — |
| | YED216M | 12 | 15 | 10 | 20 | 12 | 12 | 15 | 15 | 20 |
| (B) | 113 | 11.7 | 10.2 | 10.9 | 10.3 | 11.7 | 11.7 | 10.2 | 10.2 | 10.3 |
| | PACM | — | — | — | — | — | — | — | — | — |
| Other thickeners than (B) | J-D230 | — | — | — | — | — | — | — | — | — |
| | MDA | — | — | — | — | — | — | — | — | — |
| Thickener equivalent ratio (active hydrogen/epoxy group) | | 0.35 | 0.30 | 0.28 | 0.25 | 0.35 | 0.35 | — | — | — |
| (C) | 1400F | 4 | 4 | 4 | 4 | 6 | 4 | 4 | 4 | 6 |
| Other components | DCMU | 1 | — | 1 | 1 | 3 | — | — | — | 3 |
| | 2MZA-PW | — | 4 | — | — | — | 4 | 4 | 4 | — |
| | 4,4'-DDS | — | — | — | — | — | — | — | — | — |
| | BYK9920 | — | — | — | — | — | — | — | 1 | — |
| | FB-962 | — | — | — | — | — | — | — | — | — |
| | Methyl stearate | — | — | — | — | — | — | — | — | — |
| Pot life | (a) Viscosity at 25° C. immediately after preparation (Pa · s) | 0.8 | 1.4 | 1.8 | 2 | 0.8 | 0.8 | 1.4 | 1.4 | 2.1 |
| | (b) Viscosity at 25° C. after 3 hours (Pa · s) | 2.7 | 4.5 | 6.5 | 5 | 2.7 | 2.7 | 4.5 | 4.5 | 5.0 |
| | (b)/(a) | 3.4 | 3.2 | 3.6 | 2.5 | 3.4 | 3.4 | 3.2 | 3.2 | 2.4 |
| | Determination | A | A | A | A | A | A | A | A | A |
| B-staging | Viscosity after 5 days (Pa · s) | 20000 | 14000 | 65000 | 16000 | 20000 | 20000 | 16000 | 16000 | 20000 |
| | Determination | A | A | A | A | A | A | A | A | A |
| Fast curability | Gelation time at 140° C. (min) | 4.9 | 4.7 | 4.2 | 4 | — | — | 2.9 | 2.9 | 3.4 |
| | Determination | A | A | A | A | — | — | A | A | A |
| Resin plate | tanδ Tg (° C.) | 126 | 139 | 153 | 150 | — | 140 | — | — | — |
| Fiber-reinforced composite material | tanδ Tg (° C.) | — | 147 | — | 133 | 113 | 133 | 147 | 141 | 133 |
| | Flexural strength (MPa) | — | 331 | — | 257 | 332 | 283 | 330.6 | 282.4 | 257 |
| | Flexural modulus (GPa) | — | 23.9 | — | 18.3 | 21 | 19.5 | 23.9 | 18.8 | 18.3 |
| | Flexural | — | 1.7 | — | 1.8 | 2.08 | 1.92 | 1.7 | 1.9 | 1.8 |

TABLE 1-continued elongation (%)

| Epoxy resin composition | | | Examples | | | | | | |
|---|---|---|---|---|---|---|---|---|---|
| (parts by mass) | | | 10 | 11 | 12 | 13 | 14 | 15 | 16 |
| (A) | | 827 | 80 | 85 | 85 | 85 | 85 | 85 | 85 |
| | | 630 | 10 | — | — | — | — | — | — |
| | | 604 | — | — | — | — | — | — | — |
| (D) | | YED188 | — | — | — | — | — | — | — |
| | | YED216M | 10 | 15 | 15 | 15 | 15 | 15 | 15 |
| (B) | | 113 | 10.2 | 11.2 | 11.9 | 10.2 | 10.2 | 10.2 | 10.2 |
| | | PACM | — | — | — | — | — | — | — |
| Other thickeners than (B) | | J-D230 | — | — | — | — | — | — | — |
| | | MDA | — | — | — | — | — | — | — |
| Thickener equivalent ratio (active hydrogen/epoxy group) | | | — | — | — | — | — | — | — |
| (C) | | 1400F | 6 | 4 | 4 | — | 2 | 4 | 4 |
| Other components | | DCMU | 3 | — | — | — | — | — | — |
| | | 2MZA-PW | — | 4 | 4 | 4 | 4 | 4 | 4 |
| | | 4,4'-DDS | — | — | — | 5 | — | — | — |
| | | BYK9920 | — | — | — | — | — | — | — |
| | | FB-962 | — | — | — | — | — | 2 | — |
| | | Methyl stearate | — | — | — | — | — | — | 6 |
| Pot life | (a) Viscosity at 25° C. immediately after preparation (Pa · s) | | 1.8 | 1.3 | 1.3 | 1.3 | 1.4 | 1.3 | 1.4 |
| | (b) Viscosity at 25° C. after 3 hours (Pa · s) | | 6.8 | 4.6 | 4.4 | 4.3 | 4.5 | 4.2 | 3.7 |
| | (b)/(a) | | 3.7 | 3.5 | 3.4 | 3.3 | 3.2 | 3.2 | 2.6 |
| | Determination | | A | A | A | A | A | A | A |
| B-staging | Viscosity after 5 days (Pa · s) | | 30000 | 57000 | >160000 | 30000 | 16000 | 16000 | 10000 |
| | Determination | | A | A | B | A | A | A | A |
| Fast curability | Gelation time at 140° C. (min) | | 3.4 | 2.8 | 2.8 | 3.0 | 3.1 | 2.9 | 3.0 |
| | Determination | | A | A | A | A | A | A | A |
| Resin plate | tanδ Tg (° C.) | | — | — | — | — | — | — | — |
| Fiber-reinforced composite material | tanδ Tg (° C.) | | 136 | 143 | 143 | 110 | 149 | 145 | 122 |
| | Flexural strength (MPa) | | 320.1 | 255 | 269 | 242 | 254 | 266 | 309 |
| | Flexural modulus (GPa) | | 23.5 | 18.5 | 19.4 | 19.2 | 19 | 18.7 | 23 |
| | Flexural elongation (%) | | 1.8 | 1.84 | 1.91 | 1.84 | 1.78 | 2.12 | 1.76 |

TABLE 2

| Epoxy resin composition | | | Comparative Examples | | | |
|---|---|---|---|---|---|---|
| (parts by mass) | | | 1 | 2 | 3 | 4 |
| (A) | | 827 | 100 | 83 | 83 | 83 |
| | | 630 | — | — | — | — |
| | | 604 | — | — | — | — |
| (D) | | YED188 | — | 5 | 5 | 5 |
| | | YED216M | — | 12 | 12 | 12 |
| (B) | | 113 | 6.5 | — | — | — |
| | | PACM | — | 10.4 | — | — |
| Other thickeners than (B) | | J-D230 | — | — | 11.8 | — |
| | | MDA | — | — | — | 9.8 |
| Thickener equivalent ratio (active hydrogen/epoxy group) | | | 0.51 | 0.35 | 0.35 | 0.35 |
| (C) | | 1400F | 4 | 4 | 4 | 4 |
| Other components | | DCMU | 1 | 1 | 1 | 1 |
| | | 2MZA-PW | — | — | — | — |
| | | 4,4'-DDS | — | — | — | — |
| | | BYK9920 | — | — | — | — |
| | | FB-962 | — | — | — | — |
| | | Methyl stearate | — | — | — | — |
| Pot life | (a) Viscosity at 25° C. immediately after preparation (Pa•s) | | 9.7 | 0.8 | 0.5 | 1 |
| | (b) Viscosity at 25° C. after 3 hours (Pa•s) | | 26.3 | 8.5 | 1.1 | 1.1 |
| | (b)/(a) | | 2.7 | 10.6 | 2.2 | 1.1 |
| | Determination | | B | B | A | A |
| B-staging | Viscosity after 5 days (Pa•s) | | 25000 | 70000 | 3000 | 35 |
| | Determination | | A | A | B | B |
| Fast curability | Gelation time 140° C. (min) | | 4.7 | 4 | 4.9 | 4 |
| | Determination | | A | A | A | A |

TABLE 2-continued

| Epoxy resin composition | | Comparative Examples | | | |
|---|---|---|---|---|---|
| (parts by mass) | | 1 | 2 | 3 | 4 |
| Resin plate | tanδ Tg (° C.) | 157 | 123 | 95 | 127 |
| Fiber-reinforced composite material | tanδ Tg (° C.) | — | — | — | — |
| | Flexural strength (MPa) | — | — | — | — |
| | Flexural modulus (GPa) | — | — | — | — |
| | Flexural elongation (%) | — | — | — | — |

INDUSTRIAL APPLICABILITY

The epoxy resin composition of the invention is superior to conventional thermosetting resin compositions for molding materials, particularly epoxy resin compositions for SMC, in that the mold occupation time during molding of SMC is short and there is provided a molded article of a good fiber-reinforced composite material without flowing out of the epoxy resin composition during molding. Further, the epoxy resin composition of the invention has the same processability, moldability and pot life as conventional unsaturated polyester resins for SMC and also has excellent storage stability after impregnating a reinforcing fiber substrate with the epoxy resin composition. Since SMC using the epoxy resin composition of the invention as a matrix resin is excellent in impact resistance and heat resistance peculiar to epoxy resin and has high flexural strength and flexural modulus, the SMC is suitably used as a raw material for industrial structural parts and automobile structural parts.

The invention claimed is:

1. A molding material, comprising:
   a thickened product of an epoxy resin composition; and
   a reinforcing fiber;
   wherein the epoxy resin composition comprises:
      a component (A): an aromatic epoxy resin;
      a component (B): an alicyclic diamine;
      a component (C): an epoxy resin curing agent that is not an alicyclic diamine; and
      a component (D): an aliphatic epoxy, resin,
   wherein, when the viscosity at 25° C. immediately after preparation of the epoxy resin composition is taken as (a) and the viscosity at 25° C. after three hours from the preparation is taken as (b), the epoxy resin composition satisfies:
      (a)=0.1 to 25 Pa·s;
      (b)=0.1 to 25 Pa·s; and
      (b)/(a)≤5.

2. The molding material according to claim 1, wherein the component (B) is an alicyclic diamine having a substituent other than an amino group at β-carbon of the amino group.

3. The molding material according to claim 1, wherein the substituent other than the amino group in the component (B) is an alkyl group of 1 to 4 carbon atoms, a benzyl group, or a cyclohexyl group.

4. The molding material according to claim 1, wherein component (B) has an alicyclic skeleton in a molecule, and the amino group is directly bonded to the alicyclic skeleton.

5. The molding material according to claim 1, wherein the component (B) is a primary amine having, two alicyclic skeletons in a molecule.

6. The molding material according to claim 5, wherein the component (B) is a compound represented by Formula (1):

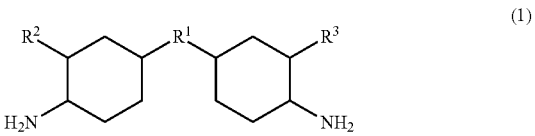

wherein
   $R^1$ represents a group selected from the group consisting of a direct bond, a methylene group, —C(CH$_3$)$_2$—, —O—, and —SO$_2$—, and
   $R^2$ and $R^3$ each independently represent a hydrogen atom or an alkyl group of 1 to 4 carbon atoms.

7. The molding material according to claim 6, wherein the component (A) comprises a component (A'): a liquid aromatic epoxy resin having a viscosity of 0.3 Pas or more at 25'C.

8. The molding material according to claim 1, wherein the component (B) is 3,3'-dimethyl-4,4'-diaminodicyclohexyl-methane.

9. The molding material according to claim 1, wherein the content of the component (B) in the epoxy resin composition is an amount that active hydrogen thereof is 0.1 to 0.5 equivalents based on a total amount of an epoxy group in the epoxy resin composition.

10. The molding material according to claim 1, wherein the content of the component (B) in the epoxy resin composition is an amount, that active hydrogen thereof is 0.2 to 0.45 equivalents based on a total amount of an epoxy group in the epoxy resin composition.

11. The molding material according to claim 1, wherein the content of the component (B) in the epoxy resin composition is an amount that active hydrogen thereof is 0.25 to 0.4 equivalents based on a total amount of an epoxy group in the epoxy resin composition.

12. The molding material according to claim 1, wherein the epoxy resin composition further comprises dicyan diamide as the component (C).

13. The molding material according to claim 1, wherein the epoxy resin composition further comprises a urea compound and/or an imidazole compound.

14. The molding material according to claim 1, wherein the component (D) is a glycidyl ether of a monovalent aliphatic alcohol of 4 to 12 carbon atoms which may have an alicyclic skeleton, or a diglycidyl ether of a divalent aliphatic alcohol of 4 to 10 carbon atoms which may have an alicyclic skeleton.

15. The molding material according to claim 1, wherein the viscosity of the component (D) at 25° C. is 100 mPa·s or less.

16. The molding material according to claim 1, wherein the content of a monofunctional amine is 5 parts by mass or less in the epoxy resin composition based on 100 parts by mass of an epoxy resin included in the epoxy resin composition.

17. The molding material according to claim 1, wherein the viscosity of the thickened product of the epoxy resin composition at 23° C. is 5000 to 150000 Pa·s.

18. The molding material according to claim 1, wherein the epoxy resin composition comprises
a component (B'): compound having a partial structure represented by Formula (2):

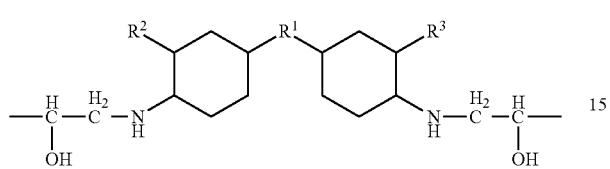

wherein
$R^1$ represents a group selected from the group consisting of a direct bond, a methylene group, —C(CH$_3$)$_2$—, —O—, and —SO$_2$—, and
$R^2$ and $R^3$ each independently represent a hydrogen atom or an alkyl group of 1 to 4 carbon atoms.

19. The molding material according to claim 1, wherein the reinforcing fiber is a carbon fiber.

20. The molding material according to claim 1, wherein the molding material is a sheet molding compound.

21. The molding material according to claim 1, wherein the molding material is a bulk molding compound.

22. A fiber-reinforced composite material, wherein the fiber-reinforced composite material is a cured product of the molding material according to claim.

23. A method of producing a sheet molding compound, comprising:
impregnating a reinforcing fiber substrate with epoxy resin composition; and
thickening the epoxy resin composition,
the epoxy resin composition comprising:
a component (A): an aromatic epoxy resin;
a component (B): an alicyclic diamine;
a component (C): an epoxy resin curing agent that is not an alicyclic diamine; and
a component (D): an aliphatic epoxy resin,
wherein, when the viscosity at 25° C. immediately after preparation of the epoxy resin composition is taken as (a) and the viscosity 25° C. after three hours from the preparation is taken as (b), the epoxy resin composition satisfies:
(a)=0.1 to 25 Pa·s;
(b)=0.1 to 25 Pa·s; and
(b)/(a)≤5.

24. A sheet molding compound, which is obtained by impregnating a reinforcing fiber substrate with an epoxy resin composition and then thickening the epoxy resin composition, the epoxy resin composition comprising:
a component (A): an aromatic epoxy resin;
a component (B): an alicyclic diamine;
a component (C): an epoxy resin curing agent that is not an alicyclic diamine; and
a component (D): an aliphatic epoxy resin,
wherein, when the viscosity at 25° C. immediately after preparation of the epoxy resin composition is taken as (a) and the viscosity 25° C. after three hours from the preparation is taken as (b), the epoxy resin composition satisfies:
(a)=0.1 to 25 Pa·s;
(b)=0.1 to 25 Pa·s; and
(b)/(a)≤5.

* * * * *